March 6, 1928.
H. D. GEYER
SPRING SHACKLE
Filed May 18, 1926
1,661,220
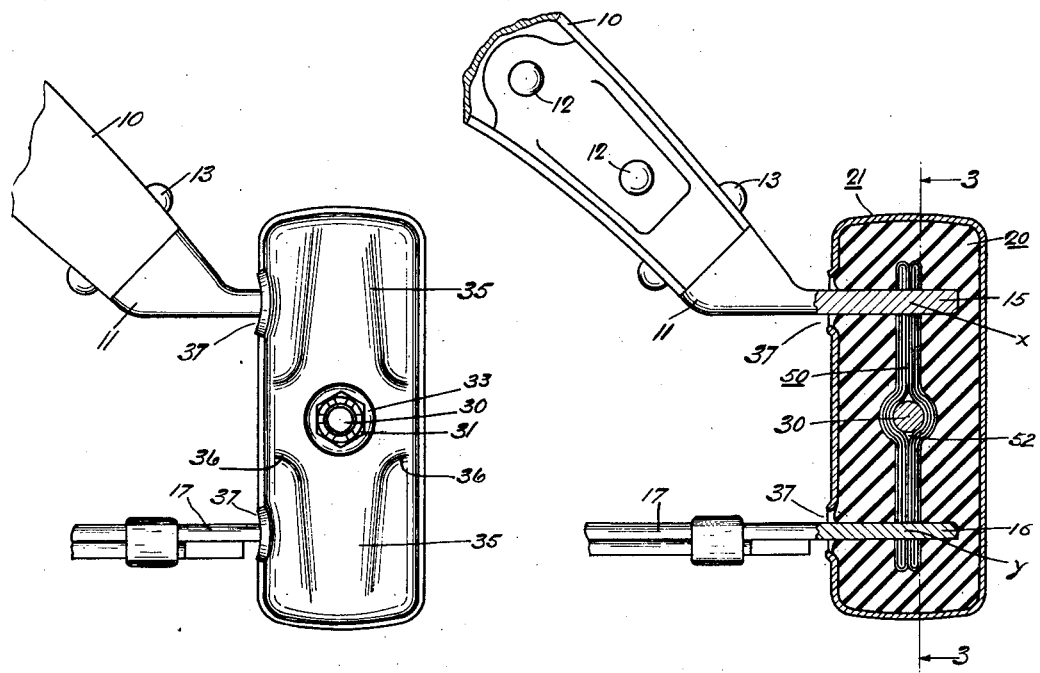
Fig. 1.
Fig. 2.
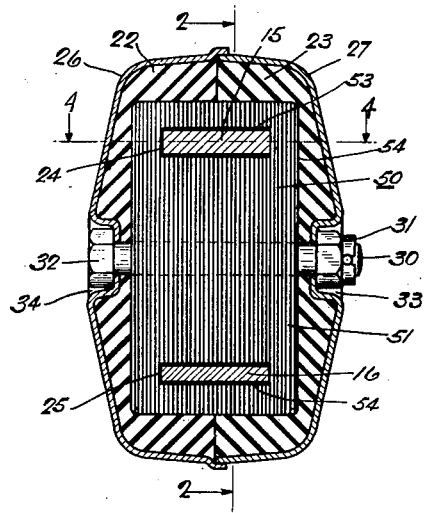
Fig. 3.
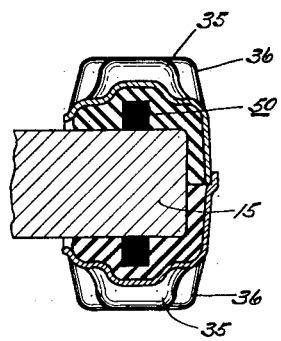
Fig. 4.
Inventor
Harvey D. Geyer,
By Spencer Sewall Hardman
Attorney Patented Mar. 6, 1928.

UNITED STATES PATENT OFFICE.

HARVEY D. GEYER, OF DAYTON, OHIO, ASSIGNOR TO THE INLAND MANUFACTURING COMPANY, OF DAYTON, OHIO, A CORPORATION OF DELAWARE.

SPRING SHACKLE.

Application filed May 18, 1926. Serial No. 109,979.

This invention relates to non-metallic connections interposed between two metallic parts of a motor vehicle, and has particular reference to the shackles connecting the springs to the chassis frame.

An object of the invention is to provide an efficient form of non-metallic shackle which eliminates the problems of wear, noise and lubrication found in metallic shackles.

Another object is to provide such a shackle which is very economical to manufacture and wherein the non-metallic parts give long wear due to only a limited distortion thereof.

Further objects and advantages of the present invention will be apparent from the following description, reference being had to the accompanying drawings, wherein a preferred form of embodiment of the present invention is clearly shown.

In the drawings:

Fig. 1 is a side elevation showing a shackle built according to this invention connecting the rear end of the rear spring of an automobile to the rear end of the chassis frame.

Fig. 2 is a vertical section on line 2—2 of Fig. 3.

Fig. 3 is a vertical section on line 3—3 of Fig. 2.

Fig. 4 is a horizontal section on line 4—4 of Fig. 3.

Similar reference characters refer to similar parts throughout the several views.

10 is the downwardly curved rear end of the chassis frame side channel. A forging 11 is rigidly fixed to the channel 10 by means of suitable rivets or bolts 12 and 13. The forging 11 has a substantially horizontal projection 15 which is located vertically above and preferably corresponds approximately in shape and size to the rear end 16 of the long spring leaf 17.

The ends 15 and 16 are held spaced apart and confined within suitable recesses in a flexible rubber block designated as a whole by numeral 20. A heavy rubberized fabric web 50, which is relatively stiff and incapable of being bent in its own plane, is inserted within the rubber block 20 and interconnects the ends 15 and 16 as clearly shown in the drawing. The block 20 is confined under compression within a suitable housing 21 which is entirely isolated from both the forging 11 and the spring 17.

A detailed description of the construction of the embodiment of the invention illustrated in the drawings follows.

The web 50 is preferably composed of a number of layers of heavy rubberized cord fabric folded, as clearly shown in Fig. 2, so that the cords 51 thereof extend vertically between the projection 15 and spring end 16 except where the cords bulge out at the central axis of the web to provide a transverse aperture 52 therethrough for the cross bolt which holds in place the two halves of the housing 21. This rubberized web 50 is molded to the form shown and vulcanized to such a degree of rigidity that it is substantially inflexible in its own plane but capable of being flexed laterally, that is, at right angles to its own plane. The two slots 53 and 54 are then cut therein of such size that the ends 15 and 16 respectively can be forced therein to give a very snug fit.

The rubber block 20 is molded in two separate halves 22 and 23 (see Figs. 3 and 4) with half of the recess 54 for the insertion of web 50 in each part 22 and 23. Also each part 22 and 23 is provided with half of the recesses 24 and 25 for the insertion of the ends 15 and 16 respectively in the assembled rubber block 20. It will now be obvious that the web 50 having been first pressed upon the ends 15 and 16 to the position shown in Fig. 2, the two halves 22 and 23 of the rubber block 20 may be assembled upon the ends 15 and 16 by sliding said halves laterally thereupon, causing the web 50 to be inserted in the recess 54 provided therefor, and the ends 15 and 16 to be inserted in the recesses 24 and 25 respectively.

The metal housing 21 is also made in halves 26 and 27 so that each half of the block 20 is encased within a corresponding half of the housing as clearly shown in Fig. 3. The halves 26 and 27 of the housing 21 are held rigidly clamped together by the transverse bolt 30, by which means the rubber block is put under the desired amount of compression by tightening up on the nut 31. Preferably the abutting edges of the housing halves 26 and 27 internest or telescope as clearly shown at 28 in Figs. 3 and 4 when they are drawn up to final position by tightening nut 31. The housing parts 26 and 27 are preferably sheet metal stampings and are so designed that they may be economically made in such manner. The tapered ridges 35 and 36 are pressed in the metal for strengthening purposes and permit a lighter gauge metal to be used for making the housing 21. The circular depressions 33 and 34 are pressed in the metal to provide recesses for the nut 31 and the bolt head 32 respectively and to provide proper clearance for a socket wrench to engage same.

The halves 26 and 27 of housing 21 have suitable clearance openings 37 to prevent contact of the metal housing 21 with the forging 11 or with the spring leaf 17. It is thus obvious that the housing 21 floats freely on the rubber block 20 and that the housing and block are free to swing angularly as a unit to provide relative longitudinal movement between the spring end 16 and the frame member 11. During this swinging movement the block 20 pivots upon the inserted ends 15 and 16 substantially about the horizontal axes $x$ and $y$, the rubber of course being distorted slightly to permit this pivotal movement. During such distortion there will be little tendency to force rubber out through the openings 37 since the inserted ends 15 and 16 displace substantially the same volume of rubber at all times. In other words, the ends 15 and 16 do not ride in and out of the block 20 to any substantial extent but merely pivot within the block and so permit the block to swing angularly as a whole to provide relative longitudinal movement between the spring end 16 and frame member 15. The fabric web 50 will give a slight amount to permit the ends 15 and 16 to pivot about the axes $x$ and $y$ respectively. The web 50 however, being substantially non-flexible in its own plane, will hold the ends 15 and 16 substantially vertically aligned at all times and thus reduce the side sway of the chassis frame upon the springs.

While the form of embodiment of the present invention as herein disclosed, constitutes a preferred form, it is to be understood that other forms might be adopted, all coming within the scope of the claims which follow.

What is claimed is as follows:

1. In combination with a vehicle spring and chassis frame, a shackle comprising: a member fixed to the chassis frame and having a flat projection positioned above the end of the spring, a rubberized fabric web extending transversely to and linking together the ends of said flat projection and spring, a flexible rubber block confining said projection and spring end and enclosing said fabric web, and a metallic housing confining said block under compression and isolated from both the spring and frame member.

2. In combination with a vehicle spring and chassis frame, a shackle comprising: a member fixed to the chassis frame and having a flat projection positioned above the end of the spring, a hard rubberized fabric web extending transversely to and linking together the ends of said flat projection and spring, a flexible rubber block confining said projection and spring end and enclosing said fabric web, and a metallic housing confining said block under compression and isolated from both the spring and frame member.

3. In combination with a vehicle spring and chassis frame, a shackle comprising: a member fixed to the chassis frame and having a flat projection positioned above and shaped similarly to the end of the spring, a rubberized fabric web extending transversely to and linking together the ends of said flat projection and spring, a flexible rubber block confining said projection and spring end and enclosing said fabric web, and a metallic housing confining said block under compression and isolated from both the spring and frame member.

4. In combination, a vehicle spring, a member rigid with the chassis frame, a flexible rubber block having two vertically spaced recesses therein within which the ends of said spring and frame member project, a stiff fibrous insert in said rubber block interconnecting said spring and member, and a rigid housing confining said rubber block and isolated from both the spring and frame member.

5. In combination, a vehicle spring, a member rigid with the chassis frame, a flexible rubber block having two vertically spaced recesses therein within which the ends of said spring and frame member project, a transverse fabric web in said rubber block interconnecting said spring and member, and a rigid housing confining said rubber block and isolated from both the spring and frame member.

6. In combination, a vehicle spring, a member rigid with the chassis frame, a flexible rubber block having two vertically spaced recesses therein within which the ends of said spring and frame member project, a hard rubberized fabric web in said rubber block interconnecting said spring and member, and a rigid housing confining said rubber block and isolated from both the spring and frame member.

In testimony whereof I hereto affix my signature.

HARVEY D. GEYER.